Jan. 12, 1937.   H. R. NAYLOR   2,067,617
BRAKE GEAR SUPPORT
Filed Sept. 27, 1933   2 Sheets-Sheet 1
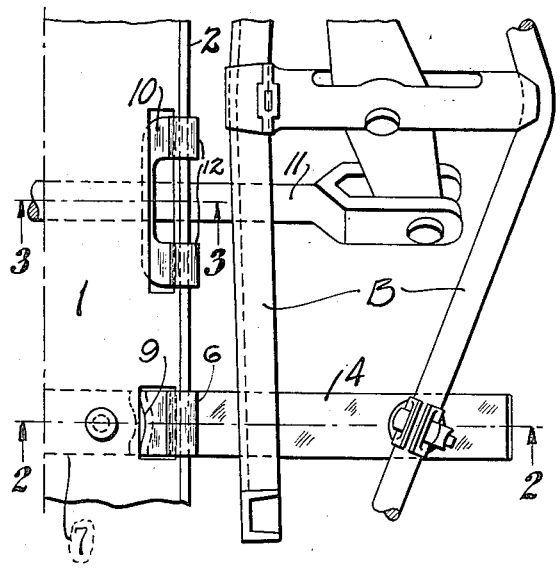
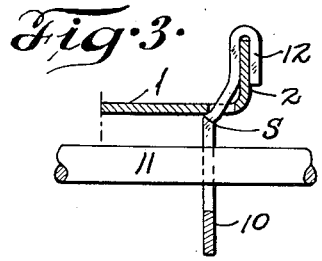
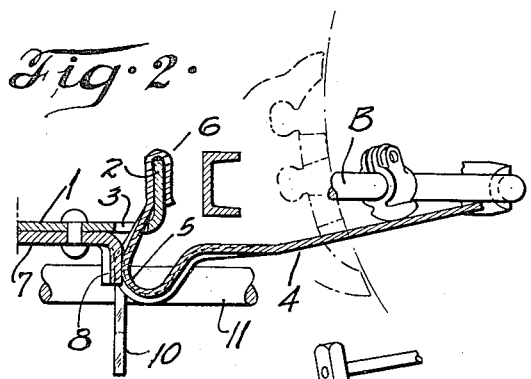
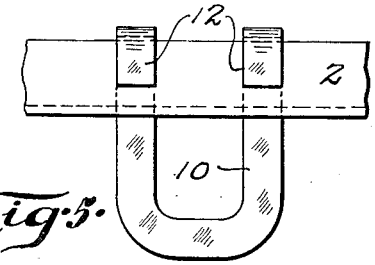
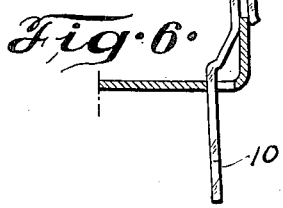
INVENTOR
Henry R. Naylor
By Rodney Bedell
ATTORNEY

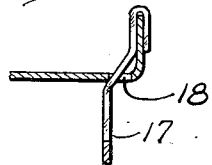
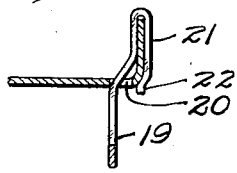
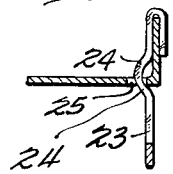
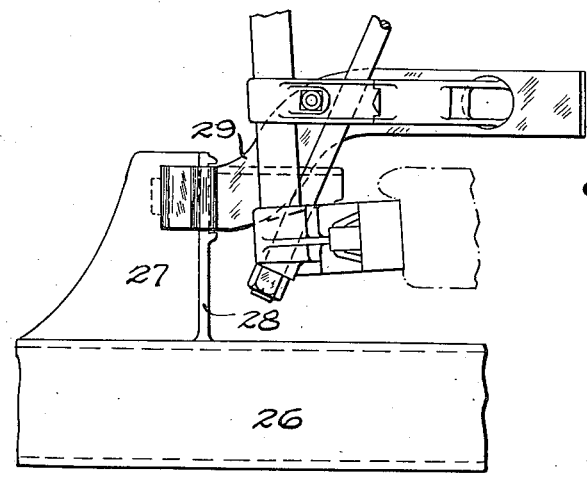
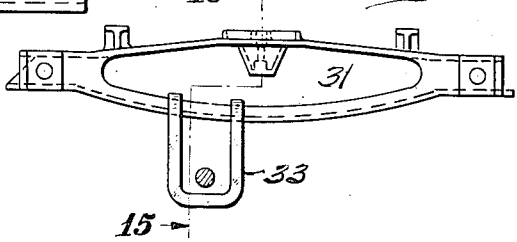
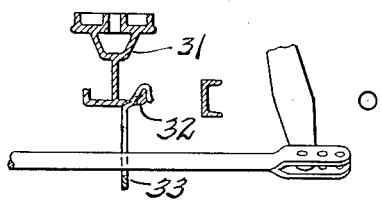
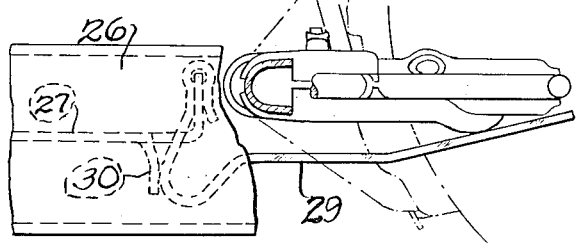
INVENTOR
Henry R. Naylor
BY Rodney Bedell
ATTORNEY Patented Jan. 12, 1937

2,067,617

UNITED STATES PATENT OFFICE 2,067,617

BRAKE GEAR SUPPORT

Henry R. Naylor, Montreal, Quebec, Canada, assignor to Chicago Railway Equipment Company, Chicago, Ill., a corporation of Illinois Application September 27, 1933, Serial No. 691,118
In Canada July 8, 1929

35 Claims. (Cl. 188—210)

My invention relates to devices used as supports, guides, and/or safety guards for railway car brake beams and bottom connecting rods or the like.

The main object of my invention is to provide a simple inexpensive device which may be readily applied to and removed from a truck part when desired, preferably without bolting, riveting, or similar attaching elements, but which will be securely held in position by the interengagement of elements on the device and the truck part.

In my application Serial No. 379,108, filed July 18, 1929, I illustrated and particularly described my invention as embodied in a guard, guide or support for a brake beam and mounted on the truck spring plank, corresponding to part of the illustrations and description herein. The present application, in addition to including this original disclosure, also illustrates and describes the invention as embodied in a bottom connecting rod guard or support and also describes a mounting of the devices upon truck parts other than the spring plank. This application is in a part a substitution for and a continuation of the earlier application Serial No. 379,108.

In the accompanying drawings which illustrate my invention—

Figure 1 is a top view of a portion of a railway truck including a spring plank, a brake beam, an operating lever therefor and a bottom connecting rod, and illustrates my invention applied to both the brake beam and the bottom connecting rod.

Figure 2 is a vertical section taken substantially on the line 2—2 of Figure 1.

Figure 3 is a similar section taken on the line 3—3 of Figure 1.

Figure 4 is a side elevation of the brake beam guard guide or support member.

Figure 5 is a side elevation of the bottom connecting rod safety guard.

Figure 6 illustrates the manner of applying the bottom connection guard.

Figures 7 and 8 illustrate modifications of the brake beam guard, guide or support member, Figure 8 being sectioned on the line 8—8 of Figure 7.

Figures 9, 10 and 11 illustrate modifications of the bottom connection guard.

Figure 12 is a detailed top view of a truck frame and brake gear illustrating a modified mounting of the brake beam guard, guide or support member and also showing another modification of the member itself.

Figure 13 is a side view of the structure shown in Figure 12, parts being broken away for better illustration.

Figure 14 is a side view of a truck bolster having a bottom connecting rod guard mounted thereon.

Figure 15 is a vertical section on the line 15—15 of Figure 14.

In the structure shown in Figures 1 and 2, the spring plank 1 is of bent plate construction having an upstanding flange 2 and the web of the spring plank is apertured near the flange as indicated at 3. This spring plank will be mounted on the truck frame (not shown) in any ordinary manner.

The brake beam individual support, guard or guide element comprises a bar, preferably of yielding material and comprising a relatively long substantially straight body portion 4, adapted to engage a portion of the brake beam indicated generally at B, an upwardly facing loop portion 5 and a downwardly facing hook 6 on the inner end of the element. The hook or jaw 6 and the upper or inner leg of the U-shape portion 5 are adapted to be passed upwardly through aperture 3 and the hook may fit over spring plank flange 2. Preferably, the sides of the hook will have a normal position, as indicated in Figure 4, from which they will have to be distorted when applied to the spring plank as shown in Figure 2 whereby the sides of the hook will clamp the spring plank flange between them.

In order to more firmly position the support element as shown, and to reduce the likelihood of vibrations tending to work the jaw off of the spring plank flange, I provide a holding member 7 on the bottom of the spring plank having a down-turned end 8 which is engaged by the adjacent hook portion 5. Preferably, the interengaging parts of the support element and member 7 are concavo-convex as indicated at 9 in Figure 1 whereby relative movement of these parts longitudinally of the spring plank is resisted and the loop portion is strengthened longitudinally of the bar.

The safety guard 10 for the bottom connecting rod 11 consists of a substantially flat bar bent in the plane of its greatest width to form a U shaped stirrup-like member, the upper portions of the legs of the U being offset from the plane of the lower portions of the cross bar and being provided with return bends 12 to form a pair of downwardly facing hooks corresponding to the hooks 6 on the brake beam guard member. The bottom connection guard is mounted on the spring plank similarly to the mounting of the brake beam guard. Shoulders S on the legs of the guard engage the undersurface of the spring plank to hold the guard against upward movement.

Figure 6 illustrates the manner of applying the bottom connection guard and it will be understood that the brake beam guard is similarly applied. By constructing the parts as shown, the guard members may be applied to the spring plank by upward movement from below the same and then lowered to slip over the spring plank flange when it will be firmly held in position without the use of any bolts, rivets, keys or other fastening elements such as are in general use. The devices are easily removed, when desired, by distortion of the parts which are yieldingly engaged. Lifting the brake beam a short distance facilitates the application or removal of its guard when the latter is at such height that it serves as a guide for the brake beam as illustrated.

Member 4 functions as a safety device for the beam and member 10 functions primarily as a safety device for the bottom connecting rod, but it will be apparent to those skilled in the art that member 10 also forms a safety device for the brake beam assembly independently of member 4 since the beam cannot drop to the rail so long as its strut, lever, and bottom connection are supported by member 10.

Figures 7 and 8 illustrate a modification in which the bar 13 is arched transversely throughout the lower corner portion to provide greater strength at this part. The sides of the hook 14 are flat and parallel throughout their length and the lower portion of the device underlies the edge 15 of the slot in the spring plank 16 so closely that the additional stop shown in Figure 2 may be eliminated.

In Figure 9 the stirrup portion of the bottom connecting rod guard 17 extends diagonally downward through the opening 18 in the spring plank and the shoulder shown in Figure 3 is eliminated.

The stirrup portion of the guard 19 in Figure 10 does not underlie the inner edge of slot 20 in the spring plank but the outer leg 21 of the guard is extended downwardly and bent inwardly as at 22 to underlie the outer corner of the spring plank and thereby yieldingly resist upward movement of the guard.

The guard 23 in Figure 11 has its main stirrup leg portions crimped as at 24 to engage the underside of the front edge of the opening 25 in the channel beam spring plank to yieldingly resist upward movement of the guard.

While the ordinary truck spring planks are well adapted to mount the devices as illustrated in connection with the foregoing description, the use of the invention is not so limited as the guards may be applied to truck parts other than the spring plank. Many car trucks are made in which the spring planks are eliminated. Such a truck is illustrated in Figures 12 and 13 in which the truck side frame 26 is provided with a bracket 27 having upstanding ribs 28 over which the brake beam guard, guide or support member 29 may be hooked similarly to the mounting of the same on the spring plank. Member 29 is shown as a plain flat bar from end to end and bracket 27 is shown provided with a downturned lug 30 arranged to engage the lower curved portion of member 29 to hold the same under greater tension against the brake beam support chair. Member 29 is offset transversely of its length so as to minimize the inward projection of bracket 27 from the frame.

In Figures 14 and 15 the truck bolster 31 has a lower member of inverted T-section, one of the arms 32 of which is provided with an opening for receiving the bottom connection rod guard 33. The contour of the hook portion of the stirrup legs of this guard is modified slightly to adapt it for mounting on the truck bolster flange but the general arrangement and manner of application are the same as previously described.

Various combinations of the features described above and illustrated in the drawings may be made without departing from the spirit of the invention and I contemplate the exclusive use of all such modifications as come within the scope of my claims.

I claim:

1. A brake beam guard, guide or support device comprising an inverted U-shaped jaw the legs of which are adapted to tightly grip the opposite sides of an upright flange on a truck part to support the device, and an arm extending outwardly from said jaw and adapted to underlie a brake beam adjacent to said truck part.

2. In combination, a truck part having an upstanding flange, and a brake beam guard, guide or support arm having an inverted U-shaped portion of spring material fitting over said flange and tightly gripping the opposite sides thereof to support the arm.

3. In combination, a car truck channel spring plank provided with an upstanding flange, and a brake beam guard, guide or support element of yielding material extending through an opening in the web of said spring plank and terminating in a hook which clamps over said flange, said hook being adapted to be disengaged from said flange and removed downwardly through said opening.

4. In combination, a car truck channel spring plank provided with an upstanding flange, and a brake beam guard, guide or support element extending through an opening in the web of said spring plank and provided with a hook fitting over said flange, said hook being adapted to be disengaged from said flange and to be removed downwardly through said opening.

5. In combination, a car truck spring plank and a brake beam guard, guide or support element extending outwardly from beneath said spring plank with its inner end projecting upwardly through said spring plank and hooked over the edge thereof.

6. In combination, a car truck spring plank, a brake beam guard, guide or support element, the end of said element forming a downwardly opening hook and said element forming an upwardly opening loop adjacent to said hook, said hook being movable through the web of said spring plank and over the flange thereof, and said loop projecting below said spring plank to limit vertical movement of said element relative to said spring plank.

7. The combination of a channel-shaped spring plank for a car truck, and a brake beam guard, guide or support element of spring material, the web of said spring plank having an aperture to allow said supporting member to pass through the plank, one end of said supporting member forming a yielding hook to clamp the flange of said spring plank, said supporting member having a distorted portion near said end and the relationship between the width of the flange of said spring plank, the length of said hook, the width of said aperture, the contour of said distortion and the spring-like quality of said element providing for manual application and removal of said element to and from said spring plank but serving to hold said supporting member fixed to said truck member with limited vertical movement until said supporting member is intentionally removed.

8. In combination, a car truck spring plank with a web and an upstanding flange, there being an aperture in said web, a member secured to said web and extending downwardly therefrom adjacent to said aperture, and a brake beam guard, guide or support element of yielding material having an end hooked over said flange, said element extending downwardly from said hook through said aperture for a substantial distance below said web and yieldingly engaging said member to be held in position thereby.

9. In combination, a car truck spring plank with a web and an upstanding flange, there being an aperture in said web, a member secured to said web and extending downwardly therefrom adjacent to said aperture, and a brake beam guard, guide or support element of yielding material having an end hooked over said flange, said element extending downwardly from said hook through said aperture for a substantial distance below said web, the abutting faces of said member and element being interengaged to resist relative movement lengthwise of said spring plank.

10. In combination, a car truck spring plank with a web and an upstanding flange, there being an aperture in said web, a member secured to said web and extending downwardly therefrom adjacent to said aperture, and a brake beam guard, guide or support element of yielding material having an end hooked over said flange and the portion of said element adjacent to said end forming a loop extending downwardly through said aperture for a substantial distance below said flange and then upwardly, there being an arm extending laterally from said loop for underlying a brake beam, said loop portion being reinforced longitudinally of the bar.

11. In combination, a car truck spring plank with a web and an upstanding flange, there being an aperture in said web, a member secured to said web and extending downwardly therefrom adjacent to said aperture, and a brake beam guard, guide or support element of yielding material having an end hooked over said flange and the portion of said element adjacent to said end forming a loop extending downwardly through said aperture for a substantial distance below said flange and then upwardly, there being an arm extending laterally from said loop for underlying said bake beam, said loop portion being reinforced longitudinally of the bar, and means engaging said loop portion below said spring plank whereby said element is more stably positioned on said spring plank.

12. A brake beam guard, guide or support device comprising a substantially flat bar of yielding material having a portion adapted to engage a truck member and having another portion adjacent to said first mentioned portion extending through said truck member and forming a loop to facilitate the application of the bar to said member, said second mentioned portion having a reinforcing corrugation extending substantially the length thereof.

13. A brake beam guard, guide, or support device having a U-shaped portion with legs gripping an upright flange on a truck part, said device being supported solely by the engagement of said legs and said flange.

14. A brake beam guard, guide, or support device including a portion adapted to extend beneath a brake beam, and a U-shaped portion adapted to hook over an upright flange on a truck part and having legs extending along and tightly gripping said flange, one of said legs terminating above the base of said flange, and the other leg merging with said first mentioned portion.

15. A brake beam guard, guide, or support device including a U-shaped portion having legs adapted to tightly grip the opposite sides of an upright flange on a truck member, a portion adapted to extend beneath a brake beam, and an intermediate loop portion, said loop portion having a reinforcing corrugation extending substantially the length thereof.

16. In combination, a support, and a brake beam safety device having means integral therewith yieldably securing said device to said support, said securing means being arranged to be be sprung into place on the support.

17. In combination, a brake beam and a safety device therefor comprising a support, and a member disposed beneath the brake beam and having means integral therewith yieldably securing said member to said support, said securing means being arranged to be sprung into place on the support.

18. In combination, a spring plank, and a brake beam safety device having means integral therewith yieldably securing the same to said spring plank, said securing means being arranged to be yieldably sprung into place on the plank.

19. In combination, a spring plank, and a brake beam safety member having a resilient clamp of substantially U-shape integral therewith for securing said safety member to the spring plank, which clamp is arranged to be sprung into place on said plank.

20. A brake beam safety device comprising a resilient cantilever beam and a yieldable clamp integral with the beam, adapted to be sprung into place.

21. A brake gear guard or support device having an inverted U-shaped portion with legs arranged to be slipped down over an upright flange on a truck part and to be spread apart by said flange and thereby grip the same and constitute the sole mounting for the device.

22. A brake gear guard or support device comprising an inverted U-shaped hook, the legs of which are arranged to slip down over an upright web on a truck part to be spread apart thereby to tightly grip the opposite sides of the web and constitute the sole mounting and positioning structure for the device, and a member extending from said hook and arranged to underlie a brake gear element adjacent to said truck part.

23. In combination in a railway truck, a support, and a brake gear safety device having means integral therewith yieldingly securing said device to said support, said securing means being arranged to be sprung into place on the support.

24. A device of the class described of general

U shape arranged to guard, guide or support a brake gear element between its legs with the upper ends of its legs having downwardly facing return bends arranged to be slipped downwardly over and to grip spaced portions of an upright flange on a truck part to form thereby the sole mounting for the device.

25. A device as specified in claim 24 which includes means facing in opposition to the return bends to engage the truck part to resist movement of the device from the truck part.

26. A safety device for a truck brake gear bottom connecting rod comprising a U-shaped member with downturned terminals on the ends of its legs for hooking over the upturned flanges on a spring plank, said legs including portions for yieldingly engaging the bottom of the spring plank to resist unhooking of said terminals.

27. In combination, a truck side frame, a bracket projecting inwardly therefrom, and a brake gear safety device with a terminal portion extending upwardly through said bracket and hooked over a part of the latter, said device extending laterally of said portion away from said side frame to more closely approach the brake gear element for which it is provided.

28. In combination in a railway truck, a support, and a combined brake beam and bottom rod safety device including means yieldingly securing said device to said support, said means being arranged to be sprung into place on the support.

29. In combination in a railway truck, a support, and a brake assembly comprising a brake beam, an operating lever therefor, and a bottom connecting rod extending below said brake beam and secured to the lower end of said operating lever, and a safety device for said assembly underlying said bottom connecting rod and having securing means arranged to be sprung into place on said support to yieldingly secure said device thereto.

30. In combination in a railway truck, a support member, a brake assembly including a brake beam, an operating lever therefor and a bottom connecting rod, and a safety device for said assembly comprising an element underlying said bottom connecting rod and having one or more downturned hooks arranged to be sprung into place on said support member to yieldingly secure said element thereto.

31. In a safety support for brake mechanism, the combination of a main supporting member, a stirrup adapted to be supported thereby to establish a support for a part of the mechanism in case it drops, and a bracket supporting the stirrup together with means for automatically securing the bracket on the supporting member.

32. A safety support for brake mechanism, comprising a stirrup through which a bottom rod may pass, and a resilient saddle thereon having a protuberance adapted for snap engagement with a supporting member on which the saddle may be mounted.

33. A safety support for brake mechanism, comprising a stirrup member through which a bottom rod may pass, and a resilient saddle member thereon having a protuberance adapted for snap engagement with a supporting member on which the saddle may be mounted, the two members of the support being integral with each other.

34. A safety support for brake mechanism, comprising a loop-shaped stirrup, and two resilient saddle members for supporting opposite sides of the stirrup, one of the saddle members having a protuberance for snap engagement with a supporting member on which the saddle members may be mounted.

35. In a railway truck, a spring plank having upwardly and downwardly facing elements, and a brake gear safety device including downwardly and upwardly facing parts respectively engaging said elements, said device comprising yielding structure and arranged to be applied to said spring plank intermediate its ends and to be sprung into place on said spring plank to hold said elements and parts in contact with each other.

HENRY R. NAYLOR.